United States Patent
Miyahara

(10) Patent No.: US 10,225,423 B2
(45) Date of Patent: Mar. 5, 2019

(54) IMAGE FORMING APPARATUS THAT COUNTS NUMBER OF PRINTS AND STORAGE MEDIUM

(71) Applicant: KYOCERA Document Solutions Inc., Osaka (JP)

(72) Inventor: Norifumi Miyahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/896,524

(22) Filed: Feb. 14, 2018

(65) Prior Publication Data

US 2018/0234569 A1 Aug. 16, 2018

(30) Foreign Application Priority Data

Feb. 14, 2017 (JP) ................................ 2017-024634

(51) Int. Cl.
- *G06F 3/12* (2006.01)
- *H04N 1/00* (2006.01)
- *H04N 1/40* (2006.01)
- *G03G 21/02* (2006.01)

(52) U.S. Cl.
CPC ......... *H04N 1/00832* (2013.01); *G03G 21/02* (2013.01); *G06F 3/1203* (2013.01); *G06F 3/1239* (2013.01); *G06F 3/1241* (2013.01); *H04N 1/40012* (2013.01)

(58) Field of Classification Search
CPC .. H04N 1/00832; H04N 1/0012; G03G 21/02; G06F 3/1203; G06F 3/1239; G06F 3/1241

See application file for complete search history.

(56) References Cited

U.S. PATENT DOCUMENTS

| | | | | |
|---|---|---|---|---|
| 2011/0135336 A1* | 6/2011 | Yamamoto | ............. | G03G 21/02 399/79 |
| 2013/0222868 A1* | 8/2013 | Maeda | ............... | H04N 1/00023 358/504 |
| 2013/0235395 A1* | 9/2013 | Li | ........................ | G06Q 30/04 358/1.9 |

FOREIGN PATENT DOCUMENTS

JP 2003-066796 A 3/2003

\* cited by examiner

*Primary Examiner* — Carla J Therrien
(74) *Attorney, Agent, or Firm* — Hawaii Patent Services; Nathaniel K. Fedde; Kenton N. Fedde

(57) ABSTRACT

Provided is an image forming apparatus capable of counting a number of prints with high accuracy and a recording medium. An MFP that includes a monochrome counter for monochrome printing and a color counter for color printing sets the monochrome counter as a target counter for reflecting the number of prints in a printing process when only monochrome toner of monochrome toner and color toner is consumed in the printing process. Moreover, the MFP sets the color counter as a target counter when color toner is consumed in a printing process. Then, the MFP reflects the number of prints in a printing process on the set target counter.

4 Claims, 15 Drawing Sheets

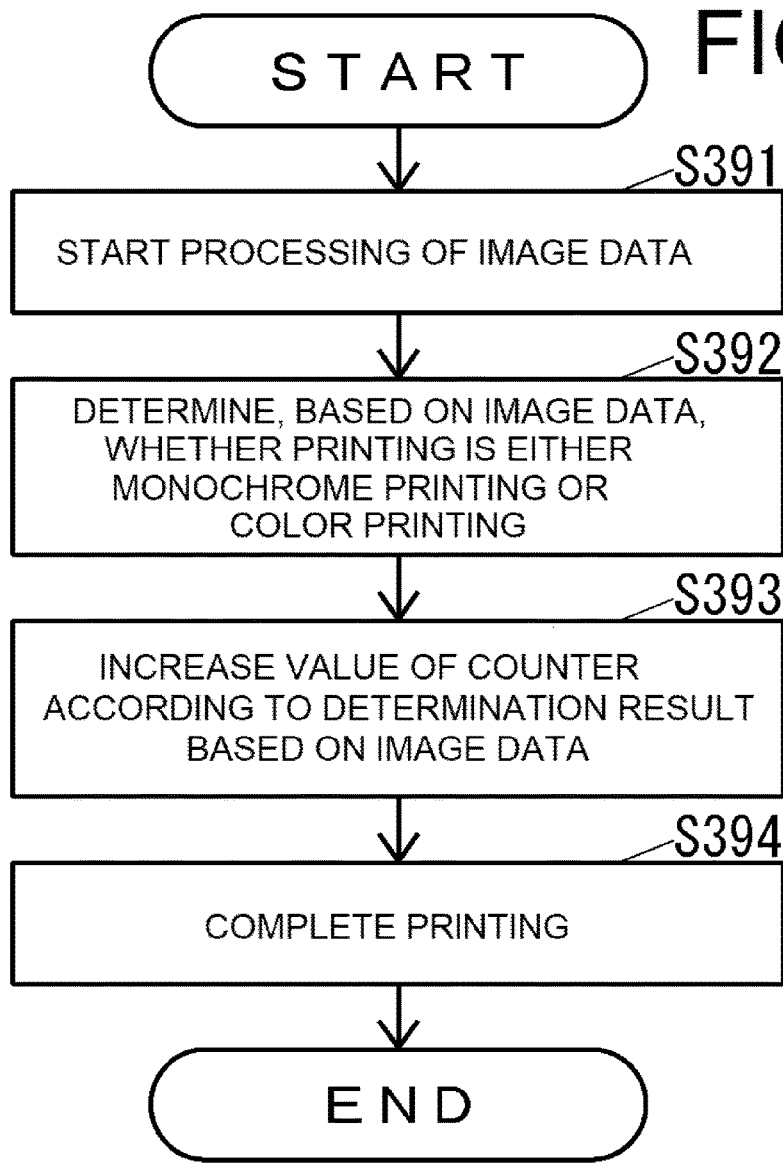

IMAGE FORMING APPARATUS THAT COUNTS NUMBER OF PRINTS AND STORAGE MEDIUM

INCORPORATION BY REFERENCE

This application is based on and claims the benefit of priority from Japanese Patent Application No. 2017-024634 filed on Feb. 14, 2017, the contents of which are hereby incorporated by reference.

BACKGROUND

The present disclosure relates to an image forming apparatus that counts the number of prints, and a storage medium.

Conventionally, an image forming apparatus that includes an image-input unit, a laser-scanning unit, a printing unit, and a billing unit is known. The image-input unit is an optical scanner or the like that converts optical information to an electric signal. The laser-scanning unit generates a printing image according to an image signal that is delivered from the image-input unit. The printing unit executes printing according to the printing image that is delivered from the laser-scanning unit. The billing unit, based on a modulated signal that is delivered from the laser-scanning unit, or in other words, a "signal that expresses printing image information that is the basis for printing a printing image", calculates a billing amount for printing by the printing unit.

A typical billing unit includes a modulated-signal classifier, a signal counter, a counter value/billing amount converter, a billing-fee calculator, and a billing-fee adder. The modulated-signal classifier classifies a modulated signal that is delivered from the laser-scanning unit into a white signal, a R (red) signal, a G (green) signal and a B (blue) signal. The signal counter measures the respective signal amounts for the white signal, R signal, G signal and B signal that are classified by the modulated-signal classifier, and functions as an analog/digital converter that digitizes each electric signal. The counter value/billing amount converter converts the respective signal amounts for the white signal, R signal, G signal and B signal that are digitized by the signal counter into billing amounts based on a conversion rate. This conversion rate may be set according to the amounts of the respective toners Y (yellow), M (magenta), C (cyan) and K (black) that are consumed for the respective white signal, R signal, G signal and B signal. The billing-fee calculator totals the respective billing amounts for the white signal, R signal, G signal and B signal that are delivered from the counter value/billing amount converter. The billing-fee adder calculates the total billing fee by adding the respective billing amounts for the white signal, R signal, G signal and B signal that are totaled by the billing-fee calculator.

SUMMARY

An image forming apparatus according to the present disclosure includes a monochrome counter, a color counter, a target-counter-setting unit, and a print-number-reflection unit. The monochrome counter is a counter for monochrome printing of counters for counting a number of prints. The color counter is a counter for color printing of the counters. The target-counter-setting unit sets a target counter of the monochrome counter and the color counter that will cause the number of prints to be reflected in the printing process. The print-number-reflection unit reflects the number of prints in the printing process on the target counter that is set by the target-counter-setting unit. The target-counter-setting unit sets the monochrome counter as the target counter when only achromatic material as a color material is consumed in the printing process. Moreover, the target-counter-setting unit sets the color counter as the target counter when chromatic material as a color material is consumed in the printing process.

A non-transitory computer readable storage medium according to the present disclosure stores a print-number-counting program, where the print-number-counting program causes the computer of the image forming apparatus to operate as a target-counter-setting unit and a print-number-reflection unit. The image forming apparatus includes a monochrome counter for monochrome printing of counters for counting a number of prints, and a color counter for color printing of the counters. The target-counter-setting unit sets a target counter of the monochrome counter and the color counter that will cause the number of prints to be reflected in the printing process. The print-number-reflection unit reflects the number of prints in the printing process on the target counter that is set by the target-counter-setting unit. The target-counter-setting unit sets the monochrome counter as the target counter when only achromatic material as a color material is consumed in the printing process. Moreover, the target-counter-setting unit sets the color counter as the target counter when chromatic material as a color material is consumed in the printing process.

BRIEF DESCRIPTION OF THE DRAWINGS

FIG. 15 illustrates steps of a modified example of operation of a third embodiment of an MFP according to the present disclosure when executing printing and counting of the number of prints.

DETAILED DESCRIPTION

In the following, embodiments according to the present disclosure will be explained with reference to the drawings.

First Embodiment

First, the configuration of a MFP (Multifunction Peripheral) will be explained as a first embodiment of an image forming apparatus according to the present disclosure.

Figure 1:
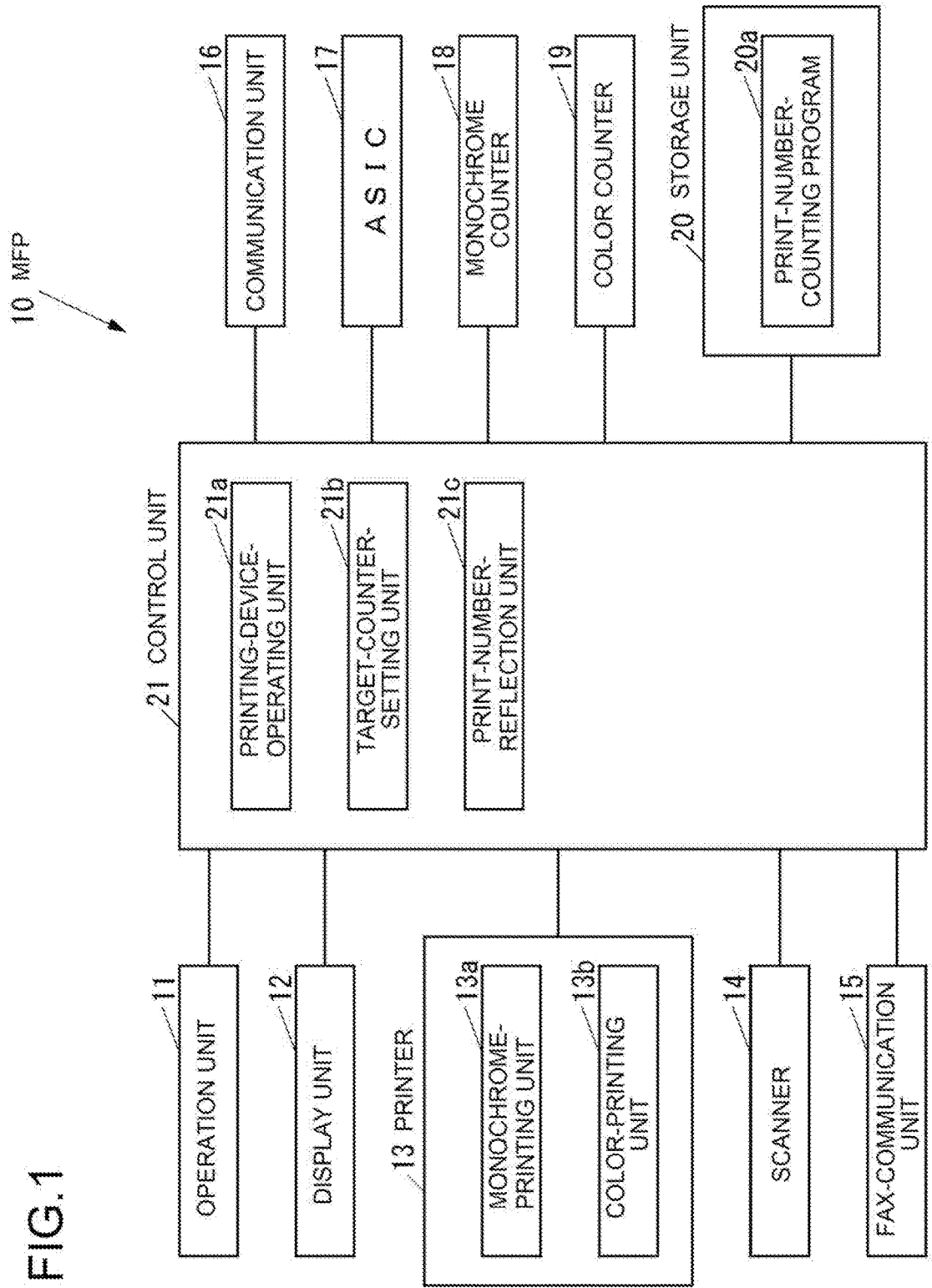
FIG. 1 illustrates the configuration of a first embodiment of an MFP according to the present disclosure.

FIG. 1 is a block diagram of an MFP 10 according to this embodiment.

As illustrated in FIG. 1, the MFP 10 includes an operation unit 11, a display unit 12, a printer 13, a scanner 14, a FAX-communication unit 15, a communication unit 16, an ASIC (Application Specific Integrated Circuit) 17, two counters, that is, a monochrome counter 18 and a color counter 19, a storage unit 20, and a control unit 21. The operation unit 11 is an input device such as buttons or the like that input various operations. The display unit 12 is a display device such as an LCD (Liquid Crystal Display) or the like that displays various information. The printer 13 is a printing device that prints images on a recording medium such as paper. The scanner 14 is a reading device that read images from a document. The FAX-communication unit 15 is a FAX device that performs FAX communication with an external facsimile apparatus via communication lines such as public telephone lines and the like. The communication unit 16 is a communication device that performs communication with an external apparatus via a network such as a LAN (Local Area Network), Internet or the like, or directly by wired or wireless communication not via a network. The ASIC (Application Specific Integrated Circuit) 17 executes at least part of a printing process. The monochrome counter 18, of the counters for counting the number of prints, is a counter for monochrome printing. The color counter 19, of the counters for counting the number of prints, is a counter for color printing. The storage unit 20 is a non-volatile storage device such as a semiconductor memory, HDD (Hard Disk Drive) or the like that stores various information. The control unit 21 controls the entire MFP 10.

The number of prints, for example, is the number of surfaces actually printed on recording media. Normally, on one sheet of a recording medium there are two surfaces; a front surface and a rear surface. Therefore, when actually printing on both surfaces of one recording medium, the number of prints for this recording medium is two. Moreover, when printing is actually performed on only one surface of one recording medium, the number of prints for this recording medium is one.

The printer 13 is a device that executes printing on a recording medium based on image data in CMYK format that is expressed by C (cyan), M (magenta), Y (yellow) and K (black). The printer 13 includes a monochrome-printing unit 13a and a color-printing unit 13b. The monochrome-printing unit 13a is a printing unit for monochrome printing that uses only black toner of the cyan, magenta, yellow and black toners. The color-printing unit 13b is a printing unit for color printing that uses at least one toner of the cyan, magenta and yellow toners. The monochrome-printing unit 13a, for example, includes a photosensitive drum for black. The color-printing unit 13b, for example, includes a photosensitive drum for cyan, a photosensitive drum for magenta, and a photosensitive drum for yellow. In monochrome printing, the color-printing unit 13b is not used. However, in color printing, the monochrome-printing unit 13a may be used. Note that the cyan, magenta, yellow, and black toners are an example of color materials. In addition, the cyan, magenta and yellow toners are an example of chromatic materials of the color materials. The black toner is an example of a achromatic material of the color materials.

The ASIC 17 forms a color-conversion unit that executes color conversion on image data based on the colors of toner that can be used in the printer 13. In other words, the ASIC 17 executes color conversion on image data to convert the image data to CMYK format.

The monochrome counter 18 and the color counter 19 may by configured by part of the storage unit 20.

The storage unit 20 stores a print-number-counting program 20a for counting the number of prints. The print-number-counting program 20a may be installed in the MFP 10 during the manufacturing stage of the MFP 10. Moreover, the print-number-counting program 20a may be additionally installed in the MFP 10 from an external storage medium such as a USB (Universal Serial Bus) memory or the like. Furthermore, the printing-number-counting program 20a may be additionally installed in the MFP 10 from a network.

The control unit 21 includes, for example, a CPU (Central Processing Unit), a ROM (Read Only Memory) that stores programs and various data, and a RAM (Random Access Memory) that is used as a work area for the CPU. The CPU executes programs that are stores in the ROM or the storage unit 20.

The control unit 21, by executing the print-number-counting program 20a, achieves a printing-device-operating unit 21a, a target-counter-setting unit 21b, and a print-number-reflection unit 21c. The printing-device-operating unit 21a causes the printer 13 to operate. The target-counter-setting unit 21b sets a target counter from among the monochrome counter 18 and color counter 19 as a target counter that will cause the number of prints to be reflected in the printing process. The print-number-reflection unit 21c reflects the number of prints in the printing process on the target counter that is set by the target-counter-setting unit 21b.

The control unit 21 is a general-purpose processing unit, so in terms of performance, is able to execute the processing that is executed by the ASIC 17. However, by the MFP 10 having an ASIC 17, it is possible to reduce the load on the control unit 21. Therefore, even when the RAM has a small capacity or the like, and the control unit 21 has low performance, for example, the MFP 10, by having an ASIC 17, is able to perform multiprocessing such as processing of a printing function and processing of a copying function.

Here, it is possible for either one of the ASIC (Type A) and ASIC (Type B) explained later to be mounted in the MFP 10 as the ASIC 17.

Figure 2:
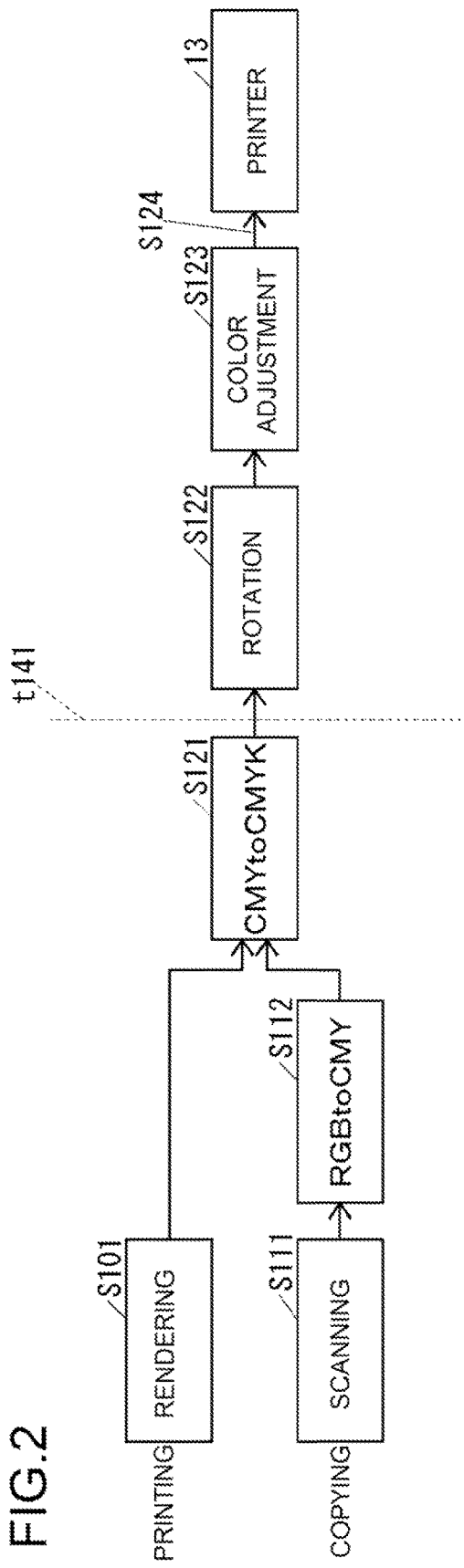
FIG. 2 illustrates an example of ASIC (Type A) processing as an example of the ASIC illustrated in FIG. 1.

FIG. 2 illustrates an example of the processing of an ASIC (Type A).

First, the processing by the ASIC (Type A) when a printing function is executed will be explained.

As illustrated in FIG. 2, the ASIC (Type A) generates image data by rendering printing data (S101). The image data that is generated in S101 is image data in CMY format that is expressed by C (cyan), M (magenta) and Y (yellow), and is not image data in a format suitable for operating the printer 13.

Next, the ASIC (Type A) executes color conversion on the target image data from CMY format to CMYK format (S121).

Next, the ASIC (Type A) executes rotation processing on the image data for which color conversion is executed in step S121 (S122). The ASIC (Type A) executes color adjustment such as halftone processing and the like on the image data for which rotation processing is performed according to the characteristics of the printer 13 (S123). After that, the ASIC (Type A) outputs the image data for which color adjustment is executed to the printer 13 (S124).

Next, processing by the ASIC (Type A) when the copying function is executed will be explained.

As illustrated in FIG. 2, the ASIC (Type A), by causing the scanner 14 to read a document, generates copy data, or in other words, generates image data of the document in RGB format (S111), and executes color conversion on the generated image data from RGB format to CMY format (S112).

Next, the ASIC (Type A), as in the case in which the printing function is executed, executes the processing from S121 to S124 on the target image data.

The ASIC (Type A) executes the processing illustrated in FIG. 2 while temporarily storing data that is being processing in the storage unit 20 or in the RAM of the control unit 21. The ASIC (Type A), when compared with the ASIC (Type B) described later, converts the image data from CMY format to CMYK format at an earlier stage. Here, when compared with image data in CMY format, image data in CMYK format has a larger amount of black color element, so there is a larger amount of data. Therefore, in the case of the ASIC (Type A), when compared with the ASIC (Type B) described later, there is a larger amount of data being processed. Here, the storage unit 20, compared with the RAM of the control unit 21, normally has a larger capacity. Therefore, in the case of the ASIC (Type A), the temporary storage destination of data being processed may be the storage unit 20.

Figure 3:
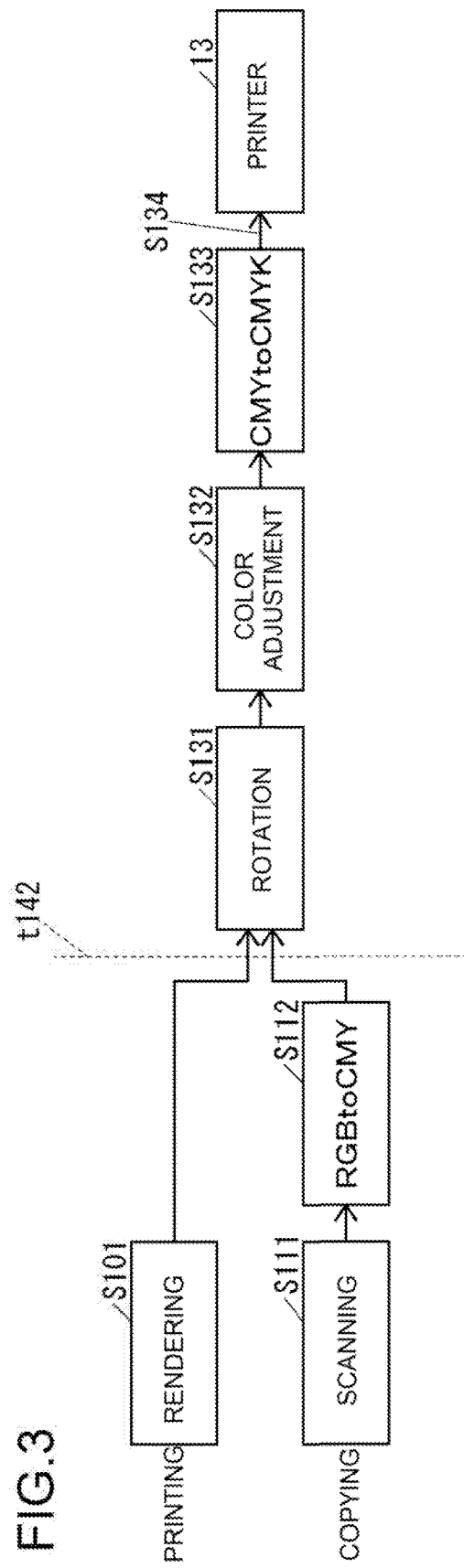
FIG. 3 illustrates an example of ASIC (Type B) processing as an example of the ASIC illustrated in FIG. 1.

FIG. 3 illustrates an example of processing by the ASIC (Type B).

First, the processing by the ASIC (Type B) when the printing function is executed will be explained.

As illustrated in FIG. 3, the ASIC (Type B), as in the case of the ASIC (Type A), executes the processing of S101.

Next, the ASIC (Type B) executes rotation processing on the target image data (S131), and executes color adjustment such as halftone processing and the like on the image data for which rotation processing is executed according to the characteristics of the printer 13 (S132).

Next, the ASIC (Type B) executes color conversion on the image data for which color adjustment is executed in S132 from CMY format to CMYK format (S133).

Next, the ASIC (Type B) outputs the image data for which color conversion is executed in S133 to the printer 13 (S134).

Next, processing by the ASIC (Type B) when the copying function is executed will be explained.

As illustrated in FIG. 3, the ASIC (Type B), as in the case of the ASIC (Type A), executes the processing of S111 to S112.

Next, the ASIC (Type B), as in the case when the printing function is executed, executes the processing of S131 to S134 on the target image data.

The ASIC (Type B) executes the processing illustrated in FIG. 3 while temporarily storing the data being processed in the storage unit 20 or the RAM of the control unit 21. The ASIC (Type B), when compared with the ASIC (Type A) described above, converts image data from CMY format to CMYK format at a later stage. Here, when compared with image data in CMYK format, image data in CMY format has a smaller amount of black color element, so there is a smaller amount of data. Therefore, in the case of the ASIC (Type B), when compared with the ASIC (Type A), there is a smaller amount of data being processed. Here, the RAM of the control unit 21, compared with the storage unit 20, normally has a smaller capacity. Therefore, in the case of the ASIC (Type B), the temporary storage destination of data being processed may be the RAM of the control unit 21. When an ASIC (Type B) is provided as the ASIC 17, the MFP 10 does not need to include a storage unit 20 when the ASIC (Type B) sets the RAM of the control unit 21 as the temporary storage destination of the data being processed. When the MFP 10 does not include a storage unit 20, the MFP 10 may store the print-number-counting program 20a in the ROM of the control unit 21, or the MFP may have a small-capacity storage unit for storing the print-number-counting program 20a.

As described above, in the case of the ASIC (Type B), when compared with the ASIC (Type A), there is smaller amount of data being processed. Therefore, when the ASIC 17 is an ASIC (Type B), it is possible to reduce the bandwidth of the CPU bus of the control unit 21, or for the MFP 10 to not have a storage unit 20 as described above, so it is possible to lower the cost of the MFP 10. Therefore, when the MFP 10 is a so-called low-end or middle-range class of MFP, the ASIC 17 is often an ASIC (Type B).

Next, the operation of the MFP 10 will be explained.

First, the operation of the MFP 10 when operating the printer 13 will be explained.

The printer 13 requires a specified amount of time from when operated by the printing-device-operating unit 21a until it becomes possible to actually execute printing. Therefore, when the printing-device-operating unit 21a operates the printer 13 after the processing of S124 or S134, the time required until printing ends becomes long.

Therefore, when an ASIC (Type A) is mounted in the MFP 10 as the ASIC 17, the printing-device-operating unit 21a operates the printer 13 at timing between S121 and S122 (t141 in FIG. 2). The printing-device-operating unit 21a may operate the printer 13 based on image data after color conversion is executed by the ASIC 17 in S121. In other words, of the colors cyan, magenta, yellow and black, when only black is included in the image data after color conversion is executed by the ASIC 17 in S121, the printing-device-operating unit 21a determines that printing is monochrome printing. Then, of the monochrome-printing unit 13a and the color-printing unit 13b, the printing-device-operating unit 21a operates only the monochrome-printing unit 13a. On the other hand, when at least one among the colors cyan, magenta and yellow is included in the image data after color conversion is executed by the ASIC 17 in S121, the printing-device-operating unit 21a determines that printing is color printing. The printing-device-operating unit 21a then operates the monochrome-printing unit 13a and the color-printing unit 13b.

Moreover, when the MFP 10 is mounted with an ASIC (Type B) as the ASIC 17, the printing-device-operating unit 21a operates the printer 13 at timing between S101 or S112 and S131 (t142 in FIG. 3). The printing-device-operating unit 21a may operate the printer 13 based on image data that is generated by the ASIC 17 in S101 or S111. In other words, when it is clear that only black is included when it is presumed that the image data that is generated by the ASIC 17 in S101 or S111 is converted to image data in CMYK format, the printing-device-operating unit 21a determines that printing is monochrome printing. The printing-device-operating unit 21a then operates only the monochrome-printing unit 13a of the monochrome-printing unit 13a and the color-printing unit 13b. However, when it is not clear that only black is included when it is presumed that the image data that is generated by the ASIC 17 in S101 or S111 is converted to image data in CMYK format, the printing-device-operating unit 21a determines that printing is color printing. The printing-device-operating unit 21a then operates the monochrome-printing unit 13a and the color-printing unit 13b.

Next, the operation of the MFP 10 when executing counting of the number of prints will be explained.

Figure 4:
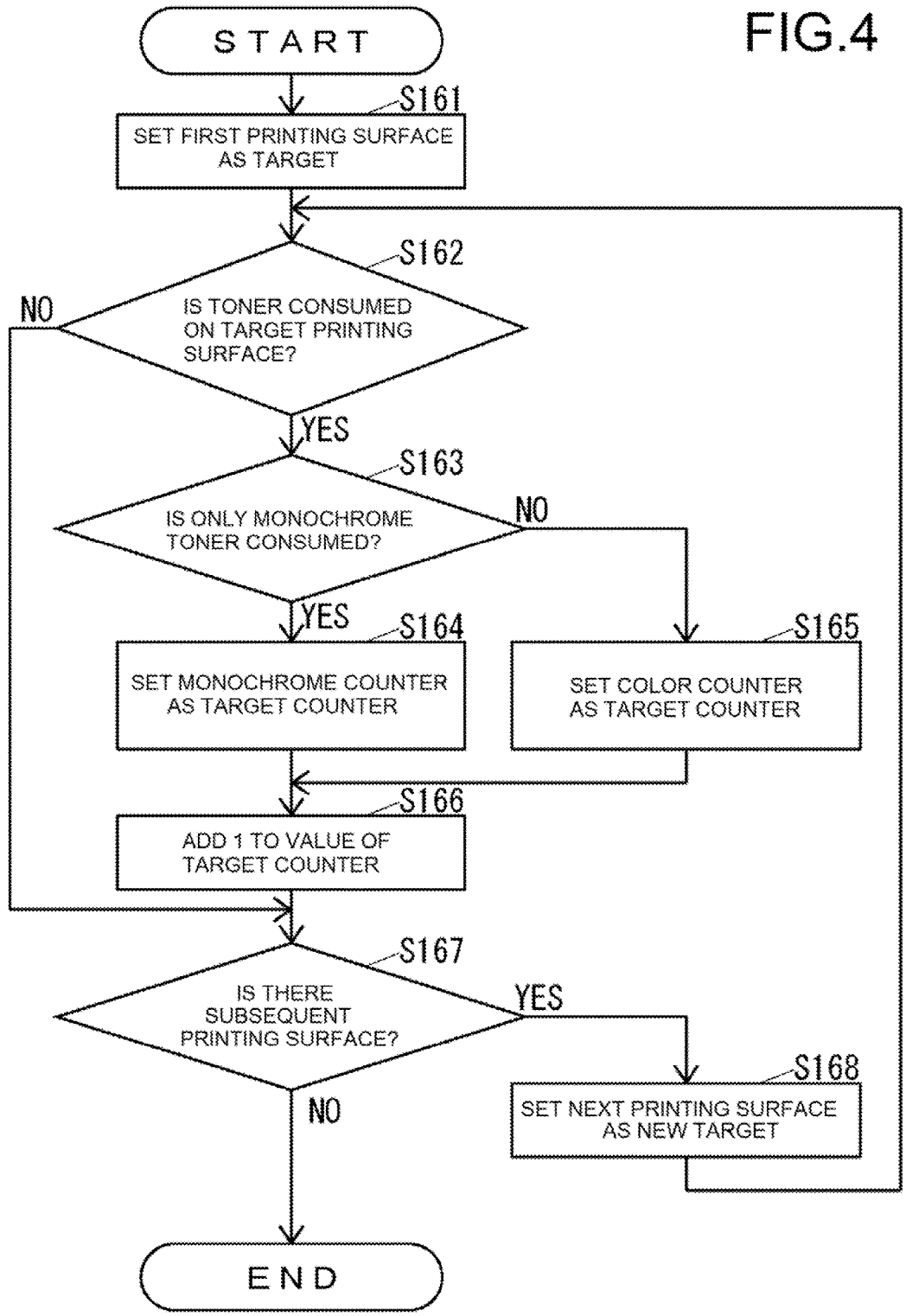
FIG. 4 illustrates steps of operation of the MFP illustrated in FIG. 1 when executing counting of the number of prints.

FIG. 4 is a flowchart of the operation of the MFP 10 when executing counting of the number of prints.

The control unit 21 executes the operation illustrated in FIG. 4 each time printing of one printing job ends.

As illustrated in FIG. 4, of the printing surfaces according to the image data in a target printing job, the print-number-reflection unit 21c makes the first printing surface the target (S161).

Next, the print-number-reflection unit 21c determines whether or not toner is consumed for the target printing surface (S162).

When it is determined in S162 that toner is consumed for the target printing surface, the target-counter-setting unit 21b determines whether or not only monochrome toner is consumed of the monochrome toner as achromatic material and color toner as chromatic material (S163).

When it is determined that only monochrome toner of the monochrome toner and color toner is consumed for the target printing surface, or in other words, when it is determined in S163 that printing is monochrome printing, the target-counter-setting unit 21b sets the monochrome counter 18 as the target counter (S164).

When it is determined that toner other than monochrome toner is consumed for the target printing surface, or in other words, when it is determined in S163 that printing is color printing, the target-counter-setting unit 21b sets the color counter 19 as the target counter (S165).

After the processing of S164 or S165, the print-number-reflection unit 21c adds 1 to the value of the target counter (S166), and then determines whether or not of the printing surfaces according to the image data in the target printing job there is a subsequent printing surface (S167).

When it is determined in S162 that toner is not consumed for the target printing surface, the print-number-reflection unit 21c executes the processing of S167 without changing the value of the monochrome counter 18 and color counter 19. In other words, the print-number-reflection unit 21c sets the number of prints when toner is not consumed to zero.

When it is determined in S167 that there is a subsequent printing surface, the print-number-reflection unit 21c executes the processing of S162 with the next printing surface of the target printing surfaces as a new target (S168).

When it is determined in S167 that there is no subsequent printing surface, the print-number-reflection unit 21c ends the operation illustrated in FIG. 4.

Next, the flow of the operation of the MFP 10 when executing printing and counting of the number of prints will be explained.

Figure 5:
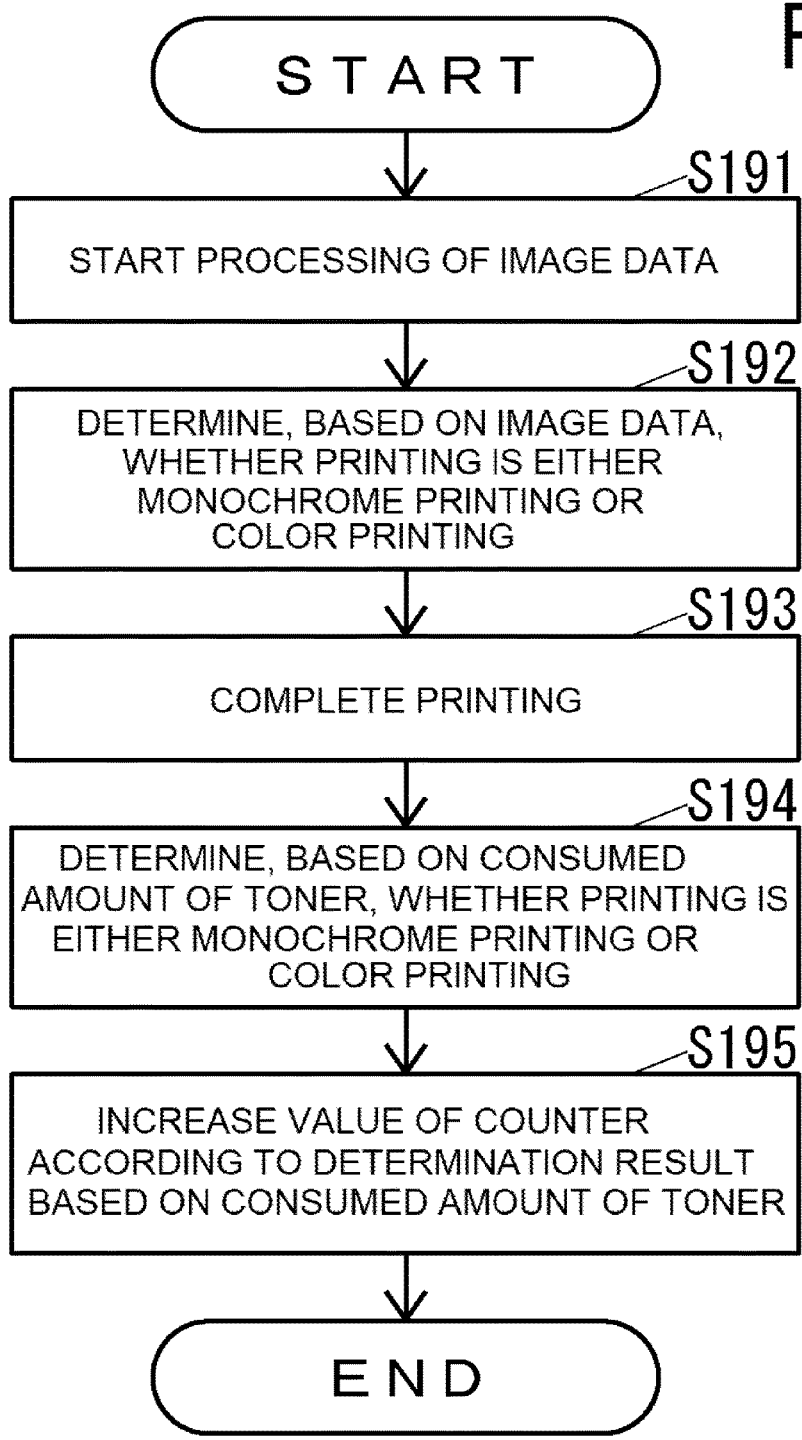
FIG. 5 illustrates steps of operation of the MFP illustrated in FIG. 1 when executing printing and counting the number of prints.

FIG. 5 is a flowchart of the operation of the MFP 10 when executing printing and counting of the number of prints. As described above, when printing ends, the processing illustrated in FIG. 4 is executed, however, FIG. 5 extracts and illustrates the main processing after printing has ended.

As illustrated in FIG. 5, after processing of image data by the ASIC 17 is started (S191), the MFP 10 determines whether the current printing is either monochrome printing or color printing based on the image data (S192). When the MFP 10 is mounted with an ASIC (Type A) as the ASIC 17, the processing of S192 is executed at t141 as described above. Moreover, when the MFP 10 is mounted with an ASIC (Type B) as the ASIC 17, the processing of S192 is executed at t142 as described above. When the result of the determination in S192 is that printing is "monochrome printing", the printing-device-operating unit 21a operates the monochrome-printing unit 13a, and when the result of the determination in S192 is that printing is "color printing", the printing-device-operating unit 21a operates the monochrome-printing unit 13a and the color-printing unit 13b.

After the processing of S192, the MFP 10 ends the execution of printing by the printer 13 (S193), and determines, based on the amount of toner consumed, whether the current printing is either monochrome printing or color printing (S194). Here, the result of determination in S192 has no effect on the determination in S194. The processing of S194 is the processing described above as S163. The printing-device-operating unit 21a will be explained for the case in which the MFP 10 is mounted with an ASIC (Type A) as the ASIC 17. After S124 illustrated in FIG. 2, the amount of monochrome toner that is consumed and the amount of color toner that is consumed for each printing surface while printing is executed by the printer 13 is stored in the storage unit 20. Moreover, the printing-device-operating unit 21a will be explained for the case in which the MFP 10 is mounted with an ASIC (Type B) as the ASIC 17. After S134 illustrated in FIG. 2, the amount of monochrome toner that is consumed and the amount of color toner that is consumed for each printing surface while printing is executed by the printer 13 is stored in the storage unit 20.

Then, the MFP 10 increases the counter value of the monochrome counter 18 and color counter 19 according to the results of the determination in S194 (S195), and ends the operation illustrated in FIG. 5. The processing of S195 is the processing described above as S166.

As explained above, when only monochrome toner of the monochrome toner and color toner is consumed in the printing process (YES in S163), the MFP 10 sets the monochrome counter 18 as the target counter (S164). Moreover, when color toner is consumed in the printing process (NO in S163), the MFP 10 sets the color counter 19 as the target counter (S165). Therefore, it is possible to set a suitable counter from among the monochrome counter 18 and the color counter 19 as the target counter, and as a result it is possible to count the number of prints with high accuracy.

The MFP 10 sets the number of prints when toner is not consumed (NO in S163) to zero, so it is possible to prevent mistakes in increasing the number of prints indicated by either the monochrome counter 18 and color counter 19. As a result, it is possible to count the number of prints with high accuracy.

Second Embodiment

The configuration of an MFP as a second embodiment of an image forming apparatus according to the present disclosure, is the same as the MFP 10 according to the first embodiment (refer to FIG. 1), so the same reference numbers will be used as for the configuration of MFP 10, and a detailed explanation will be omitted.

The operation of the MFP according to this embodiment will be explained.

First, the operation of the MFP according to this embodiment when executing counting of the number of prints will be explained.

Figure 6:
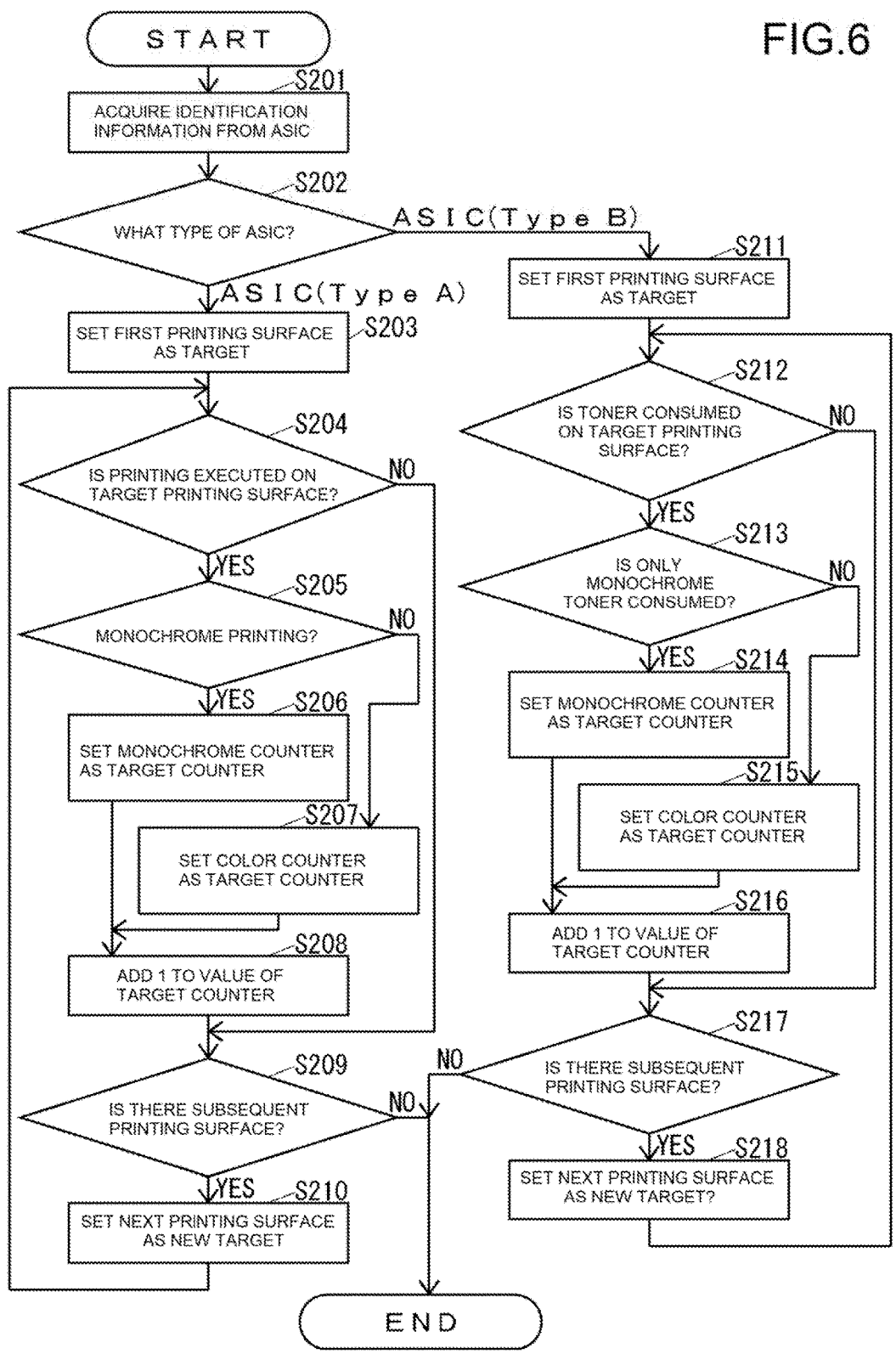
FIG. 6 illustrates steps of operation of a second embodiment of an MFP according to the present disclosure when executing counting of the number of prints.

FIG. 6 is a flowchart of the operation of the MFP according to this embodiment when executing counting of the number of prints.

The control unit 21 executes the operation illustrated in FIG. 6 every time printing for one printing job ends.

As illustrated in FIG. 6, the target-counter-setting unit 21*b* acquires identification information from the ASIC 17 (S201), and based on the acquired information, determines the type of the ASIC 17 (S202).

When the ASIC 17 is determined in S202 to be an ASIC (Type A), the print-number-reflection unit 21*c* sets the first printing surface of the printing surfaces according to the image data in the target printing job to be the target (S203).

Next, the print-number-reflection unit 21*c* determines whether or not printing has been executed for the target printing surface based on the image data (S204). The image data that is used in S204 is image data that is generated in S121.

When it is determined in S204 that printing has been executed for the target printing surface, the print-number-reflection unit 21*c*, based on the image data, determines whether or not the printing on the target printing surface is monochrome printing (S205). The image data that is used in S205 is image data that is generated in S121.

When it is determined that printing on the target printing surface is monochrome printing, the target-counter-setting unit 21*b* sets the monochrome counter 18 as the target counter (S206).

When it is determined that printing on the target printing surface is not monochrome printing, or in other words, when it is determined in S205 that printing is color printing, the target-counter-setting unit 21*b* sets the color counter 19 as the target counter (S207).

After the processing of S206 or S207, the print-number-reflection unit 21*c* adds one to the value of the target counter (S208), and determines whether or not there is a subsequent printing surface of the printing surfaces according to the image data in the target printing job (S209).

When it is determined in S204 that printing has not been executed on the target printing surface, the print-number-reflection unit 21*c* executes the processing of S209 without changing the values of the monochrome counter 18 and color counter 19.

When it is determined in S209 that there is a subsequent printing surface, the print-number-reflection unit 21*c* executes the processing of S204 with the next printing surface of the target printing surfaces as the new target (S210).

When it is determined in S209 that there is no subsequent printing surface, the print-number-reflection unit 21*c* ends the operation illustrated in FIG. 6.

When it is determined in S202 that the ASIC 17 is an ASIC (Type B), the control unit 21 executes the processing of S211 to S218 that is the same as the processing of S161 to S168 (refer to FIG. 4), and ends the operation illustrated in FIG. 6.

Next, the flow of the operation of the MFP according to this embodiment when executing printing and counting of the number of prints will be explained.

Figure 7:
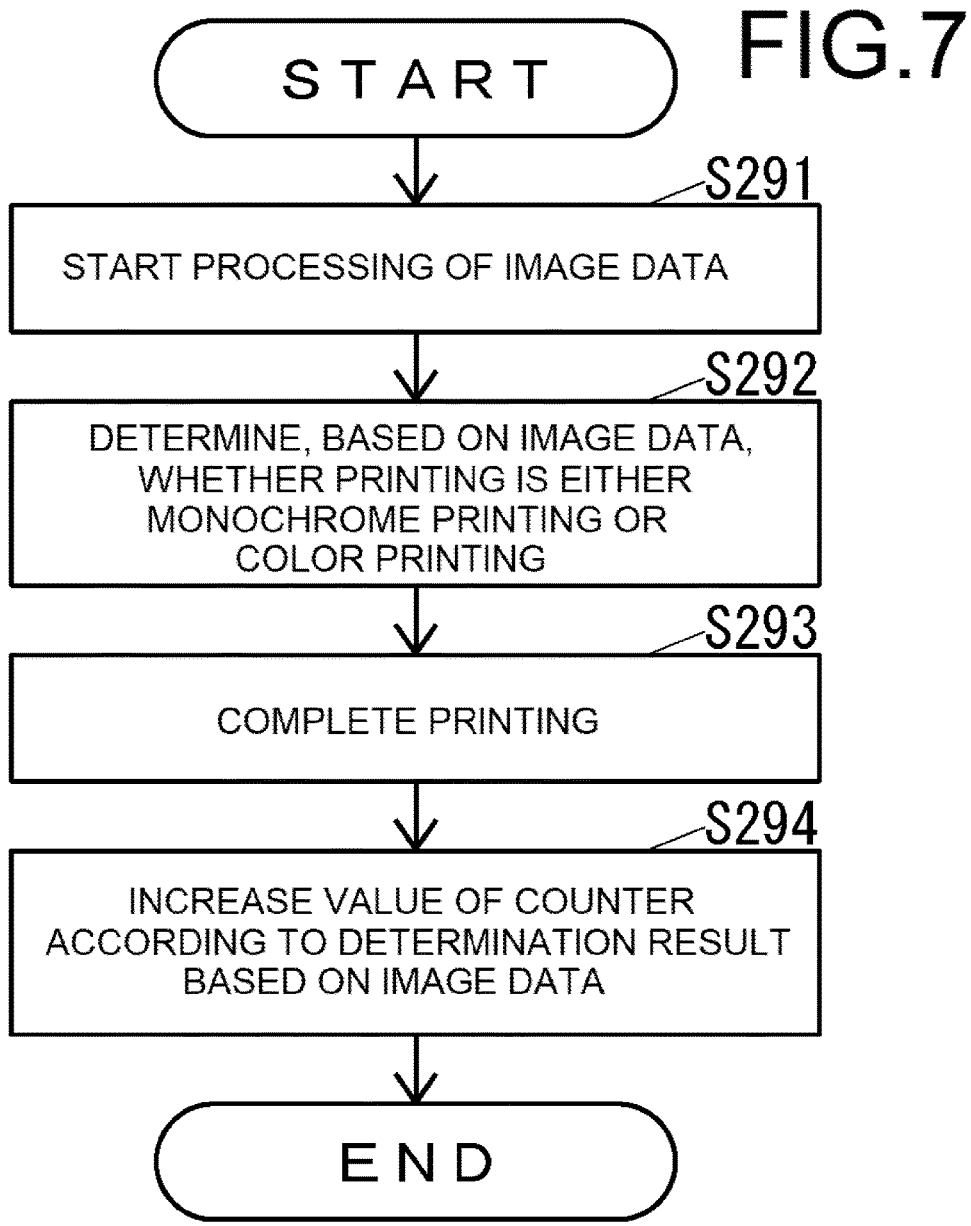
FIG. 7 illustrates steps of operation of a second embodiment of an MFP according to the present disclosure when executing printing and counting of the number of prints when the ASIC is an ASIC (Type A).

FIG. 7 is a flowchart of the operation of the MFP according to this embodiment when executing printing and counting of the number of prints when the ASIC 17 is an ASIC (Type A). As described above, the processing illustrated in FIG. 6 is executed when printing ends, however, FIG. 7 extracts and illustrates the main processing after printing has ended.

As illustrated in FIG. 7, the MFP according to this embodiment executes the processing of S291 to S293 that is the same as the processing of S191 to S193 of the first embodiment (see FIG. 5).

Then, of the monochrome counter 18 and the color counter 19, the MFP according to this embodiment increases the value of the counter that corresponds to the result of the determination in S292 (S294), and ends the operation illustrated in FIG. 7. The processing of S294 is the processing described above as S208.

The operation when the ASIC 17 is an ASIC (Type B) is the same as in the first embodiment (refer to FIG. 5), so an explanation is omitted.

As described above, when the MFP according to this embodiment operates the printer 13 based on image data after color conversion to CMYK format is executed by the ASIC 17, the MFP sets the target counter based on image data after color conversion is executed (S205 to S207). In other words, this is the case when the ASIC 17 is an ASIC (Type A). Moreover, the target counter is not set according to the consumed amount of toner in the printing process. Therefore, it is possible to reduce the amount of processing for setting the target counter.

Third Embodiment

The configuration of an MFP as a third embodiment of an image forming apparatus according to the present disclosure is the same as the configuration of the MFP 10 according to the first embodiment (refer to FIG. 1), so the same reference numbers will be used as for the configuration of MFP 10, and a detailed explanation will be omitted.

The operation of the MFP according to this embodiment will be explained.

First, the operation of the MFP according to this embodiment will be explained when the timing for counting the number of prints is set.

Figure 8:
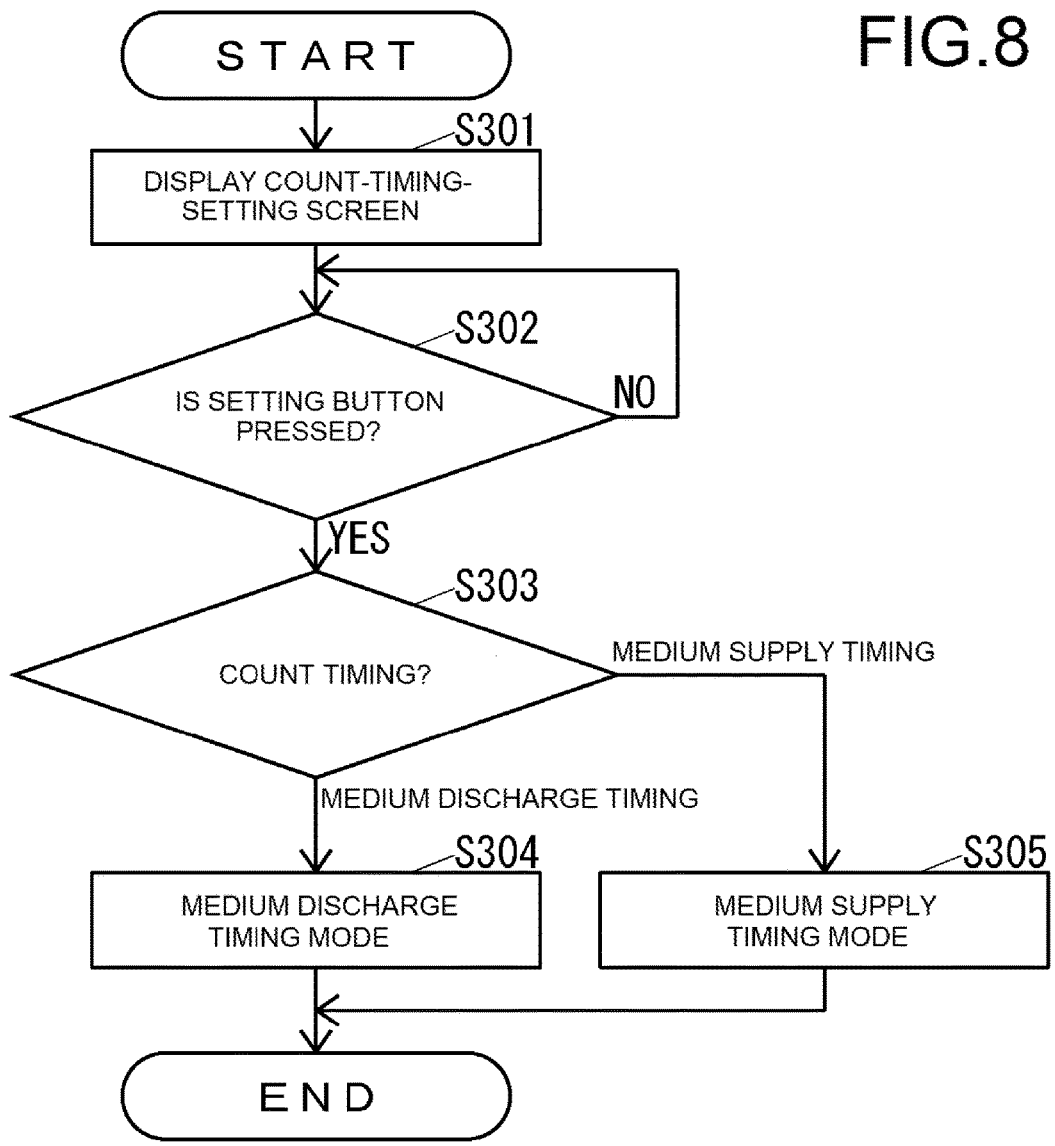
FIG. 8 illustrates steps of operation of a third embodiment of an MFP according to the present disclosure when timing for the counting of the number of prints is set.

FIG. 8 is a flowchart of the operation of the MFP according to this embodiment when the timing for counting the number of prints is set.

When an instruction for setting the timing for counting the number of prints is inputted to the operation unit 11, the control unit 21 executes the operation illustrated in FIG. 8.

As illustrated in FIG. 8, the control unit 21 displays a count-timing-setting screen 400 (refer to FIG. 9) on the display unit 12 (S301). Either one of timing of the end of discharge of recording medium by the printer 13 (hereafter, referred to as "medium discharge timing") and the timing of the start of supplying recording medium by the printer 13 (hereafter, referred to as "medium supply timing") is set on the counter-timing-setting screen 400 as the timing for counting the number of prints.

Figure 9:
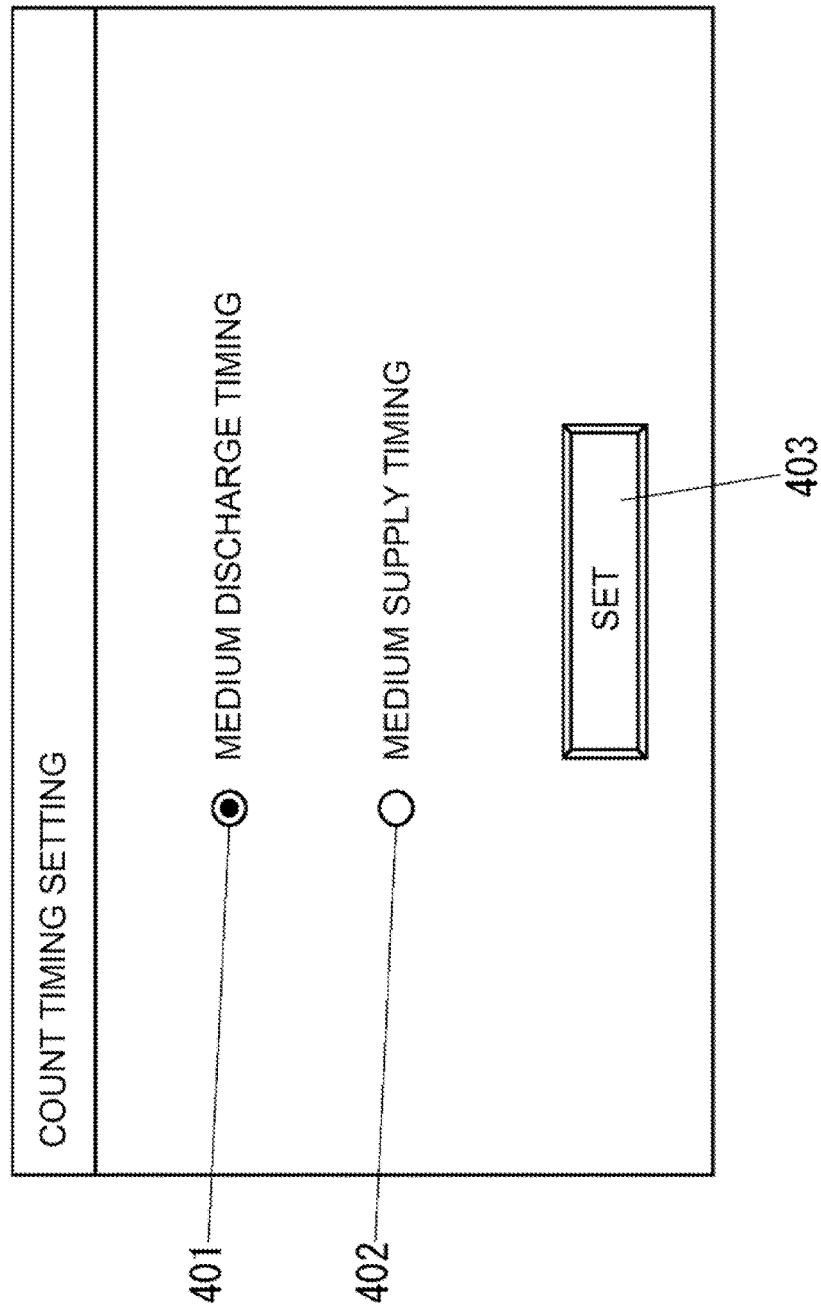
FIG. 9 illustrates an example of a count-timing-setting screen that is displayed on the display unit of a third embodiment of an MFP according to the present disclosure.

FIG. 9 illustrates an example of the count-timing-setting screen 400.

As illustrated in FIG. 9, the count-timing-setting screen 400 includes a radio button 401, a radio button 402 and a setting button 403. Medium discharge timing is selected using the radio button 401. Medium supply timing is selected using the radio button 402. The selection made using the radio button 401 or radio button 402 is set using the setting button 403.

The radio button 401 and radio button 402 are in always in a state in which only one is selected.

As illustrated in FIG. 8, after the processing of S301 and until it is determined that the setting button 403 is pressed, the control unit 21 determines whether or not the setting button 403 has been pressed (S302).

When it is determined in S302 that the setting button 403 has been pressed, the control unit 21 determines which of the medium output timing or medium supply timing is set as the timing for counting the number of prints (S303). More specifically, when the radio butting 401 is selected at the time when the setting button 403 is pressed, the control unit 21 determines that medium discharge timing is set as the timing for counting the number of prints. However, when the radio butting 402 is selected at the time when the setting button 403 is pressed, the control unit 21 determines that medium supply timing is set as the timing for counting the number of prints.

When it is determined in S303 that medium discharge timing is set as the timing for counting the number of prints, the control unit 21 sets the operating mode of the MFP according to this embodiment to the medium discharge timing mode (S304), and ends the operation illustrated in FIG. 8.

When it is determined in S303 that medium supply timing is set as the timing for counting the number of prints, the control unit 21 sets the operating mode of the MFP according to this embodiment to the medium supply timing mode (S305), and ends the operation illustrated in FIG. 8.

In the MFP according to this embodiment, the default setting for the timing for counting the number of prints may be medium discharge timing.

The MFP according to this embodiment can suppress the occurrence of "improper avoidance of counting the number of prints by removing printing medium that has been printed on by the printer 13 from the printer 13 before being discharged by the printer 13". This is the case when the operating mode is the medium supply timing mode.

Next, the operation of the MFP according to this embodiment when the operating mode is the medium discharge timing mode will be explained.

The MFP according to this embodiment, when the operating mode is the medium discharge timing mode, may execute printing and counting of the number of prints in the same way as in the first embodiment, or may execute printing and counting of the number of prints in the same way as in the second embodiment.

Next, the operation of the MFP according to this embodiment when the operating mode is the medium supply timing mode will be explained.

First, the operation of the MFP according to this embodiment when executing the counting of the number of prints at medium supply timing will be explained.

Figure 10:
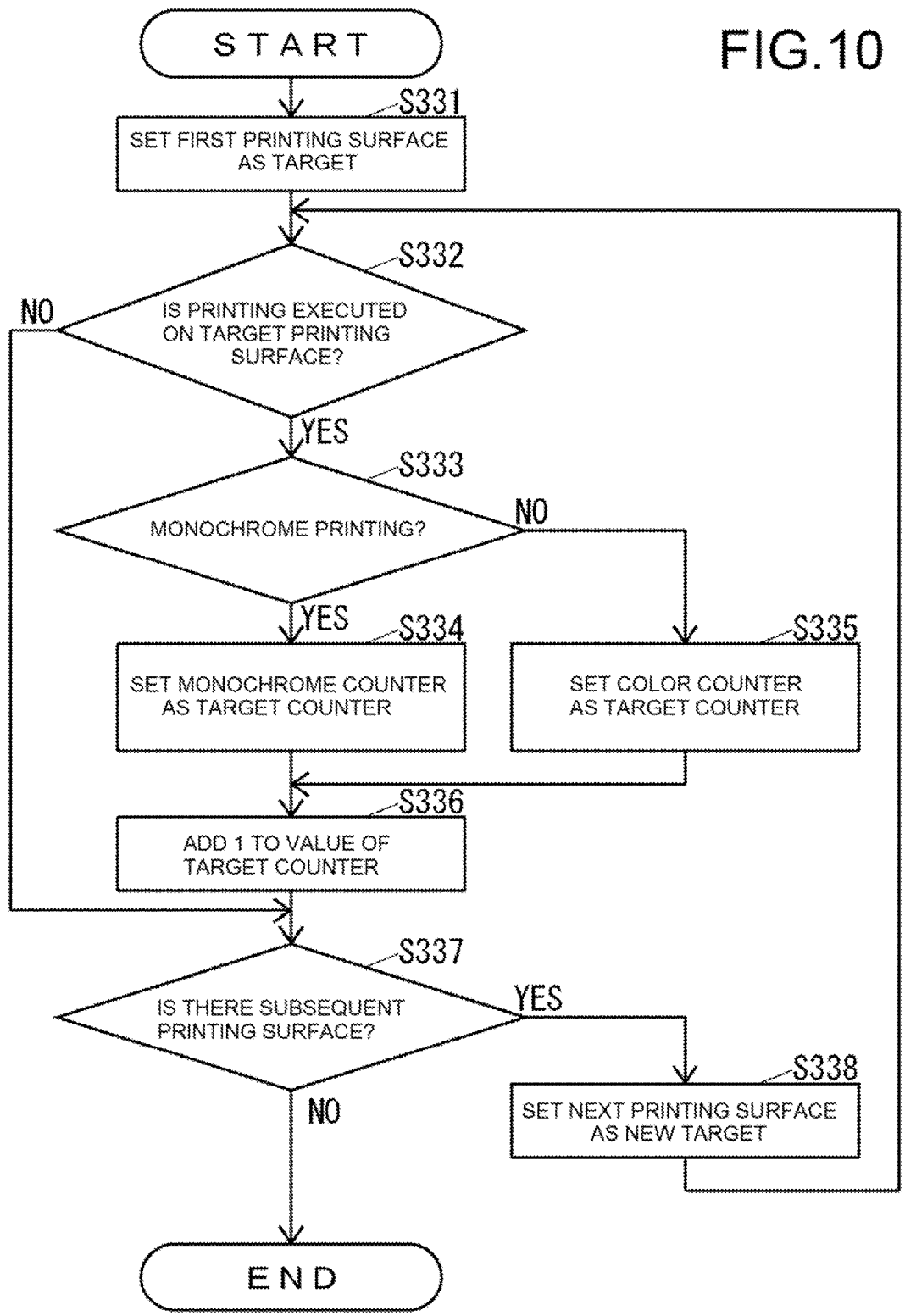
FIG. 10 illustrates steps of operation of a third embodiment of an MFP according to the present disclosure when executing counting of the number of prints at the timing of supplying a medium.

FIG. 10 is a flowchart of the operation of the MFP according to this embodiment when executing the counting of the number of prints at medium supply timing.

The control unit 21 executes the operation illustrated in FIG. 10 at every medium supply timing.

As illustrated in FIG. 10, the print-number-reflection unit 21c sets the first printing surface of the printing surfaces according to the image data for the target printing medium as the target (S331).

Next, the print-number-reflection unit 21c, based on the image data, determines wither or not printing has been executed on the target printing surface (S332). The image data that is used in S332 is image data that is generated in S121 when the MFP according to this embodiment is mounted with an ASIC (Type A) as the ASIC 17. Moreover, the image data that is used in S332 is image data that is generated in S101 or S111 when the MFP according to this embodiment is mounted with an ASIC (Type B) as the ASIC 17.

When it is determined in S332 that printing has been executed on the target printing surface, the print-number-reflection unit 21c, based on the image data, determines whether or not printing on the target printing surface is monochrome printing (S333). The image data that is used in S333 is image data that is generated in S121 when the MFP according to this embodiment is mounted with an ASIC (Type A) as the ASIC 17. Moreover, the image data that is used in S333 is image data that is generated in S101 or S111 when the MFP according to this embodiment is mounted with an ASIC (Type B) as the ASIC 17.

When it is determined in S333 that the printing on the target printing surface is monochrome printing, the target-counter-setting unit 21b sets the monochrome counter 18 as the target counter (S334).

When it is determined in S333 that the printing on the target printing surface is not monochrome printing, or in other words, when it is determined that the printing is color printing, the target-counter-setting unit 21b sets the color counter 19 as the target counter (S335).

After the processing of S334 or S335, the print-number-reflection unit 21c adds 1 to the value of the target counter (S336), and determines whether or not there is a subsequent printing surface of the printing surfaces according to the image data for the target recording medium (S337).

When it is determined in S332 that printing has not been performed on the target printing surface, the print-number-reflection unit 21c executes the processing of S337 without changing the values of the monochrome counter 18 and the color counter 19.

When it is determined in S337 that there is a subsequent printing surface, the print-number-reflection unit 21c sets the next printing surface of the target printing surfaces as the new target (S338), and executes the processing of S332.

When it is determined in S337 that there is no subsequent printing surface, the print-number-reflection unit 21c ends the operation illustrated in FIG. 10.

Next, the operation of the MFP according to this embodiment when correcting the count of the number of prints at the time when printing ends will be explained.

Figure 11:
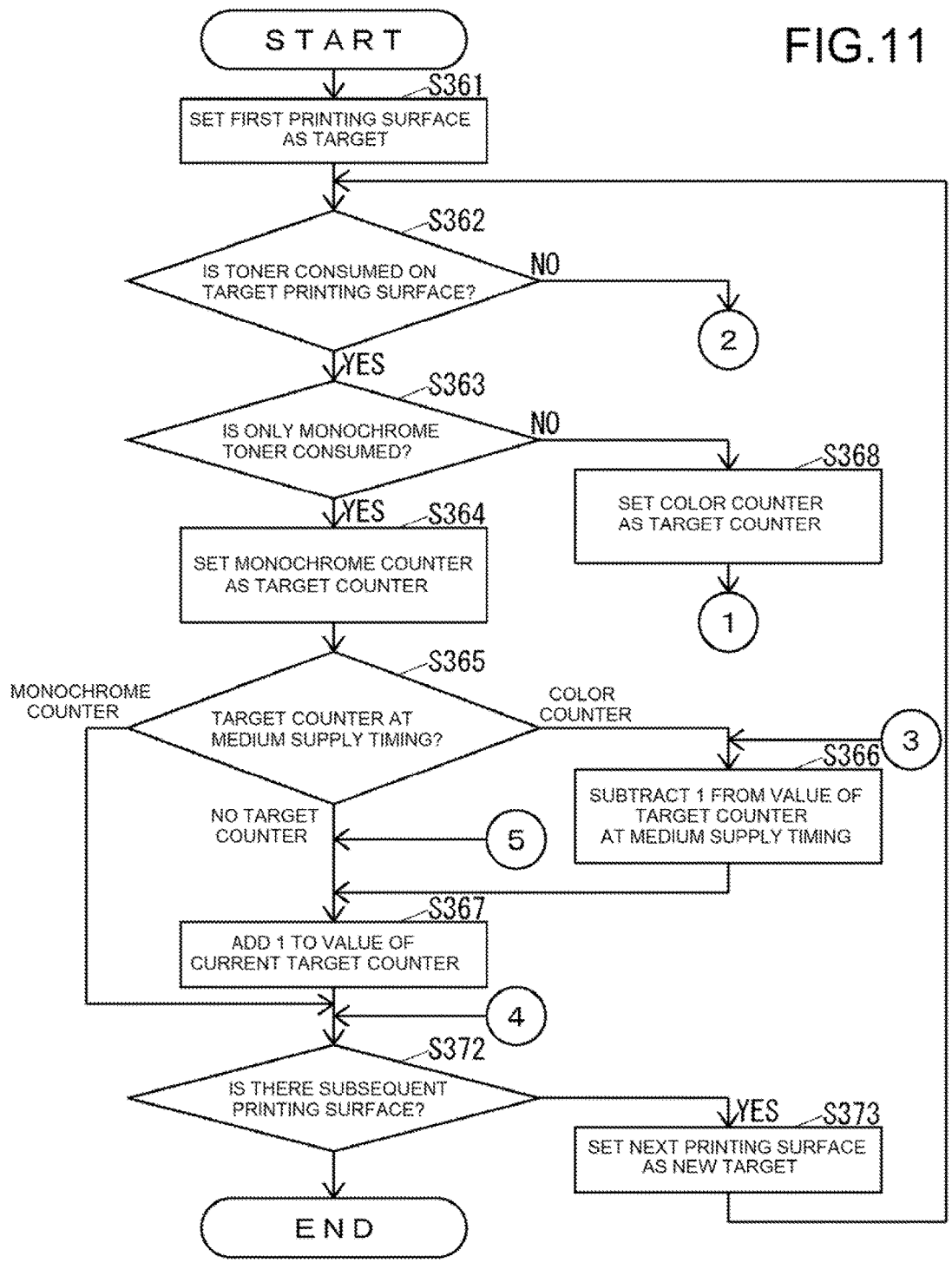
FIG. 11 illustrates steps of part of the operation of a third embodiment of an MFP according to the present disclosure when correcting the count of the number of prints at the point in time when printing ends.
Figure 12:
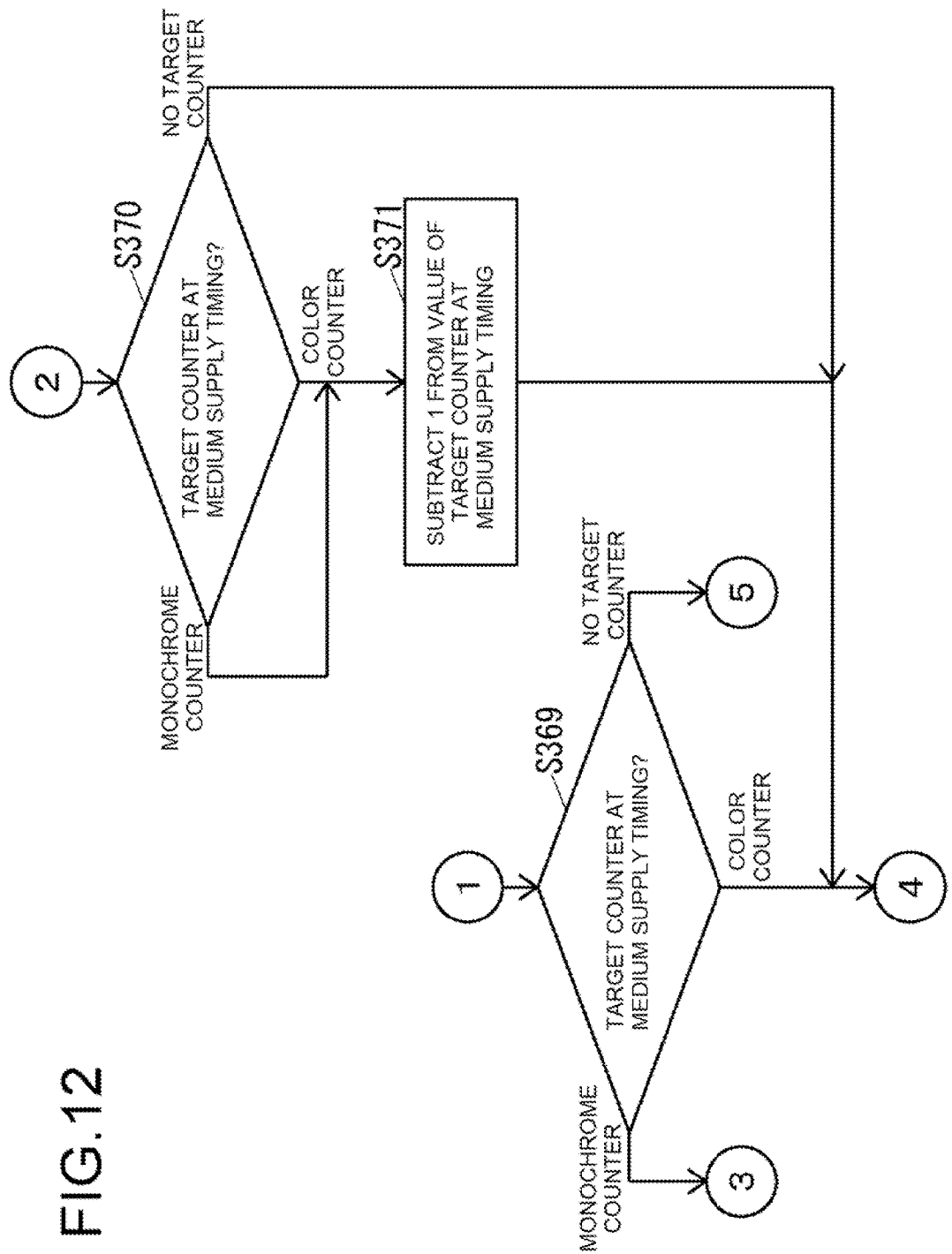
FIG. 12 illustrates steps of the continuing operation illustrated in FIG. 11.

FIG. 11 and FIG. 12 are flowcharts of the operation of the MFP according to this embodiment when correcting the count of the number of printing at the time when printing ends.

The control unit 21 executes the operation illustrated in FIG. 11 and FIG. 12 every time printing of one printing job ends.

As illustrated in FIG. 11 and FIG. 12, the print-number-reflection unit 21c sets the first printing surface of the printing surfaces according to image data in the target printing job as the target (S361).

Next, the print-number-reflection unit 21c determines whether or not toner has been consumed on the target printing surface (S362).

When it is determined in S362 that toner has been consumed on the target printing surface, the target-counter-setting unit 21b determines whether or not only monochrome toner of the monochrome toner and color toner has been consumed on the target printing surface (S363).

When it is determined in S363 that only monochrome toner of the monochrome toner and color toner has been consumed on the target printing surface, or in other words, when it is determined that printing is monochrome printing, the target-counter-setting unit 21b sets the monochrome counter 18 as the target counter (S364).

Next, the print-number-reflection unit 21c determines the target counter that is set by the processing illustrated in FIG. 10 at the medium supply timing for the target printing surface (S365).

The case in which the print-number-reflection unit 21c determines in S365 that the target counter that is set by the processing illustrated in FIG. 10 at the medium supply timing for the target printing surface is the color counter 19 will be explained. The print-number-reflection unit 21c subtracts 1 from the value of the target counter that is set by the processing illustrated in FIG. 10 at the medium supply timing for the target printing surface, or in other words, from the value of the color counter 19 (S366). Moreover, the print-number-reflection unit 21c adds 1 to the current target counter, or in other words, to the value of the monochrome counter 18 (S367). Then, the print-number-reflection unit 21c determines whether or not there is a subsequent printing surface of the printing surfaces according to the image data in the target printing job (S372).

The operation when the print-number-reflection unit 21c determines in S365 that there is no target counter that is set by the processing illustrated in FIG. 10 at the medium supply timing for the target printing surface will be explained. The print-number-reflection unit 21c adds 1 to the value of the current target counter, or in other words, the monochrome counter 18 (S367), and executes the processing of S372.

The operation when the print-number-reflection unit 21c determines in S365 that the target counter that is set by the processing illustrated in FIG. 10 at the medium supply timing for the target printing surface is the monochrome counter 18 will be explained. The print-number-reflection unit 21c executes the processing of S372 without changing the values of the monochrome counter 18 and the color counter 19.

When it is determined in S363 that toner other than monochrome toner is consumed on the target printing surface, or in other words, when printing is color printing, the target-counter-setting unit 21b sets the color counter 19 as the target counter (S368).

Next, the print-number-reflection unit 21c determines the target counter that is set by the processing illustrated in FIG. 10 at the medium supply timing for the target printing surface (S369).

The operation when the print-number-reflection unit 21c determines in S369 that the target counter that is set by the processing illustrated in FIG. 10 at the medium supply timing for the target printing surface is the monochrome counter 18 will be explained. The print-number-reflection unit 21c subtracts 1 from the value of the target counter that is set by the processing illustrated in FIG. 10 at the medium supply timing for the target printing surface, or in other words the monochrome counter 18 (S366). Moreover, the print-number-reflection unit 21c adds 1 to the value of the current target counter, or in other words, the color counter 19 (S367), and executes the processing of S372.

The operation when the print-number-reflection unit 21c determines in S369 that there is no target counter that is set by the processing illustrated in FIG. 10 at the medium supply timing for the target printing surface will be explained. The print-number-reflection unit 21c adds 1 to the value of the current target counter, or in other words, the color counter 19 (S367), and executes the processing of S372.

The operation when the print-number-reflection unit 21c determines in S369 that the target counter that is set by the processing illustrated in FIG. 10 at the medium supply timing for the target printing surface is the color counter 19 will be explained. The print-number-reflection unit 21c executes the process of S372 without changing the values of the color counter 19 and the monochrome counter 18.

When it is determined in S362 that toner is not consumed on the target printing surface, the print-number-reflection unit 21c determines the target counter that is set by the processing illustrated in FIG. 10 at the medium supply timing for the target printing surface (S370).

The operation when the print-number-reflection unit 21c determines in S370 that the target counter that is set by the processing illustrated in FIG. 10 at the medium supply timing for the target printing surface is the monochrome counter 18 will be explained. The print-number-reflection unit 21c subtracts 1 from the value of the target counter that is set by the processing illustrated in FIG. 10 at the medium supply timing for the target printing surface, or in other words the monochrome counter 18 (S371), and executes the processing of S372.

The operation when the print-number-reflection unit 21c determines in S370 that the target counter that is set by the processing illustrated in FIG. 10 at the medium supply timing for the target printing surface is the color counter 19 will be explained. The print-number-reflection unit 21c subtracts 1 from the value of the target counter that is set by the processing illustrated in FIG. 10 at the medium supply timing for the target printing surface, or in other words the color counter 19 (S371), and executes the processing of S372.

When it is determined in S370 that there is no target counter that is set by the processing illustrated in FIG. 10 at the medium supply timing for the target printing surface, the print-number-reflection unit 21c executes the process of S372 without changing the values of the color counter 19 and monochrome counter 18.

When it is determined in S372 that there is a subsequent printing surface, the print-number-reflection unit 21c sets the next printing surface of the target printing surfaces as the new target (S373), and executes the processing of S362.

When it is determined in S372 that there is no subsequent printing surface, the print-number-reflection unit 21c ends the operation illustrated in FIG. 11 and FIG. 12.

Next, the flow of the operation of the MFP according to this embodiment when executing printing and counting of the number of prints will be explained.

Figure 13:
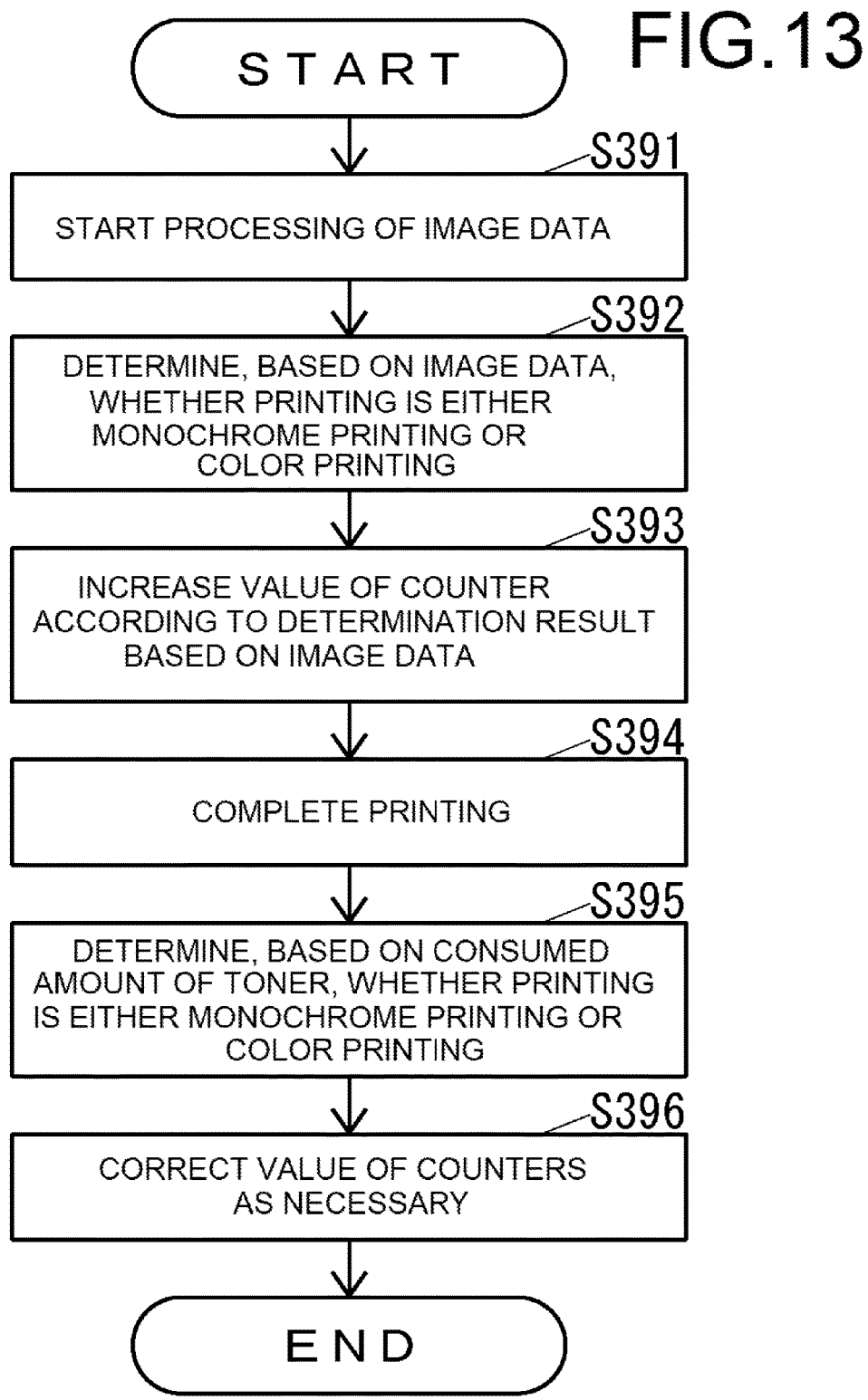
FIG. 13 illustrates steps of operation of a third embodiment of an MFP according to the present disclosure when executing printing and counting of the number of prints.

FIG. 13 is a flowchart of the operation of the MFP according to this embodiment when executing printing and counting of the number of prints. As described above, the processing illustrated in FIG. 11 and FIG. 12 is executed when printing ends, however, FIG. 13 extracts and illustrates the main processing after printing has ended.

As illustrated in FIG. 13, after processing of image data by the ASIC 17 is started (S391), the MFP according to this embodiment determines, based on the image data, whether the current printing is either monochrome printing or color printing (S392). The processing of S392 is the processing described above as S333.

Then, the MFP according to this embodiment increases the value of the counter of the monochrome counter 18 and color counter 19 according to the determination result in S392 (S393). The processing of S393 is the processing described above as S336.

After the processing of S393, the MFP according to this embodiment completes execution of printing by the printer 13 (S394), and determines, based on the consumed amount of toner, whether the current printing is either monochrome printing or color printing (S395). The processing of S395 is the processing described above as S363. The operation of the printing-device-operating unit 21a when the MFP 10 is mounted with an ASIC (Type A) as the ASIC 17 will be explained. After S124 illustrated in FIG. 2, the printing-device-operating unit 21a, while printing is being executed by the printer 13, stores the consumed amount of monochrome toner and the consumed amount of color toner for each printing surface in the storage unit 20. Moreover, the operation of the printing-device-operating unit 21a when the MFP 10 is mounted with an ASIC (Type B) as the ASIC 17 will be explained. After S134 illustrated in FIG. 2, the printing-device-operating unit 21a, while printing is being executed by the printer 13, stores the consumed amount of monochrome toner and the consumed amount of color toner for each printing surface in the storage unit 20.

When the determination result in S392 and the determination result in S395 are different, the MFP according to this embodiment corrects as necessary at least one value of the monochrome counter 18 and the color counter 19 (S396), and ends the operation illustrated in FIG. 13. The processing of S396 is the processing described above as S366, S367 and S371.

As explained above, the operation of the MFP according to this embodiment when reflecting the number of prints in the printing process on the counters at medium supply timing will be explained. When the target counter that is set by a specified method before the medium supply timing and the target counter that is set based on the consumed amount of toner in the printing process are different, the MFP corrects the number of prints reflected on the counters at the medium supply timing (S366m S367 and S371). Cases in which the target counters are different are cases such as when the target counter is the "color counter" in S365, "no target counter" in S365, the "monochrome counter" in S369, "no target counter" in S369, the "monochrome counter" in S370, or the "color counter" in S370. Therefore, even when the number of prints in the printing process is reflected on the counters at the medium supply timing, it is possible to count the number of prints with high accuracy.

When the ASIC 17 is an ASIC (Type A), the MFP according to this embodiment does not need to execute correction of the values of the counters according to the consumed amounts of toner even when the operating mode is the medium supply timing mode. More specifically, the MFP according to this embodiment may execute the operation illustrated in FIG. 14 instead of the operation illustrated in FIG. 11.

Figure 14:
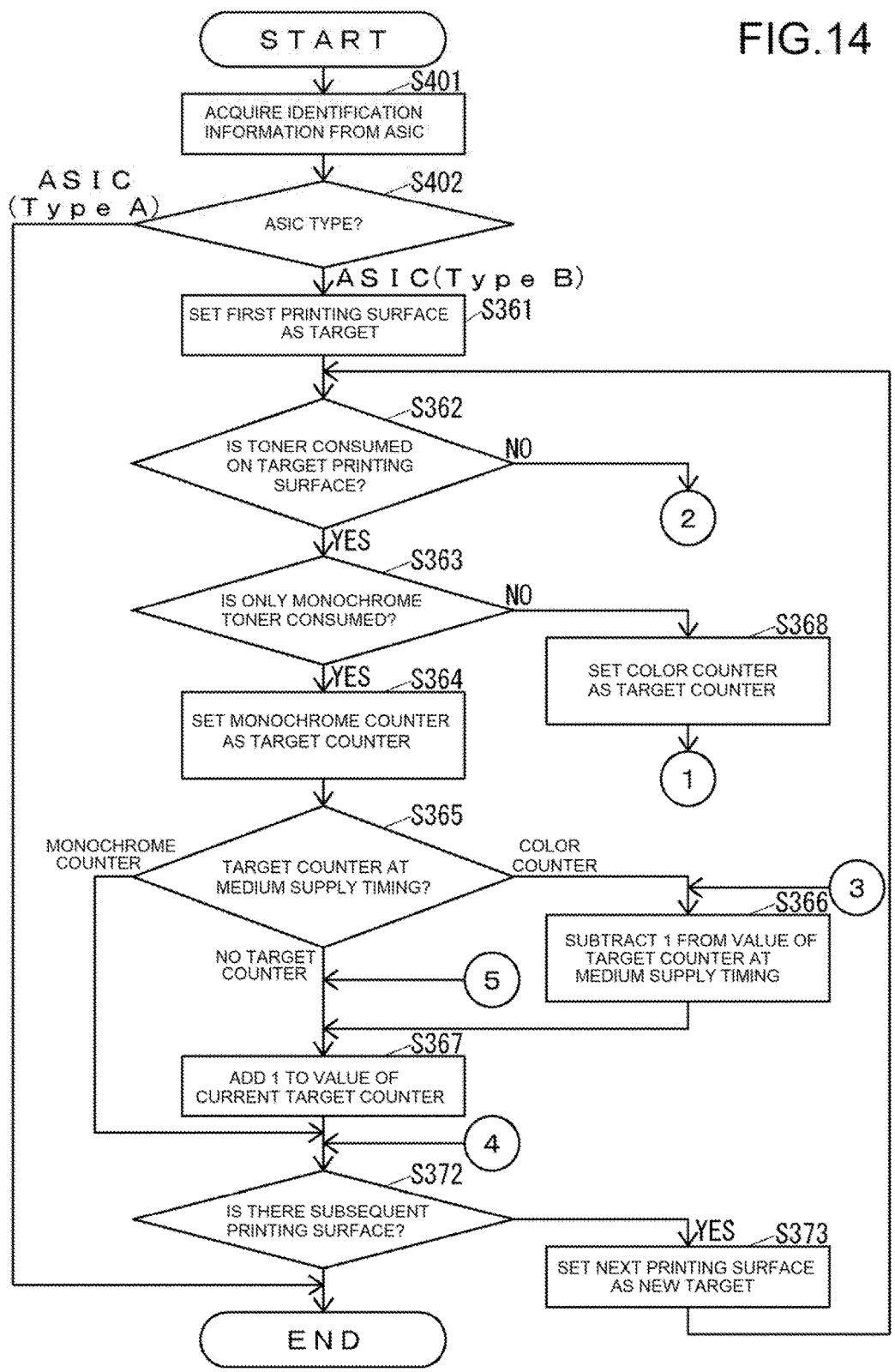
FIG. 14 illustrates steps of a modified example of operation of a third embodiment of an MFP according to the present disclosure when correcting the count of the number of prints at the point in time when printing ends.

FIG. 14 is part of a flowchart of a modified example of the operation of the MFP according to this embodiment when correcting the count of the number of prints at the time when printing ends.

As illustrated in FIG. 14 and FIG. 12, the print-number-reflection unit 21c acquires identification information from the ASIC 17 (S401), and determines the type of ASIC 17 based on the acquired identification information (S402).

When it is determined in S402 that the ASIC 17 is an ASIC (Type A), the print-number-reflection unit 21c ends the operation illustrated in FIG. 14 and FIG. 12.

When it is determined in S402 that the ASIC 17 is an ASIC (Type B), the print-number-reflection unit 21c executes the processing of S361 to S373 in the same way as in FIG. 11, and ends the operation illustrated in FIG. 14 and FIG. 12.

When the MFP according to this embodiment executes the operation illustrated in FIG. 14 and FIG. 12, and the ASIC 17 is an ASIC (Type A), a flowchart of the operation of the MFP according to this embodiment when executing printing and counting of the number of prints is as illustrated in FIG. 15.

The operation illustrated in FIG. 15 is the operation illustrated in FIG. 13 from which the processing of S395 and S396 are deleted.

In each of the embodiments described above, the target-counter-setting unit 21b sets a target counter for each printing surface. However, the target-counter-setting unit 21b may set a target counter for each recording medium, or may set a target counter for each printing job. When setting a target counter for each recording medium, the target-counter-setting unit 21b sets the monochrome counter 18 as the target counter when only black toner of the cyan, magenta, yellow and black toners is used in printing of a recording medium. Moreover, when setting the target counter for each recording medium, the target-counter-setting unit 21b sets the color counter 19 as the target counter when at least one toner of the cyan, magenta and yellow toners is used in printing of a recording medium. Similarly, when setting the target counter for each printing job, the target-counter-setting unit 21b sets the monochrome counter 18 as the target counter when only black toner of the cyan, magenta, yellow and black toners is used in the printing job. Moreover, when setting the target counter for each printing job, the target-counter-setting unit 21b sets the color counter 19 as the target counter when at least one toner of the cyan, magenta and yellow toners is used in the printing job. The case in which the target counter is set based on the consumed amount of toner was explained, however, the case of setting the target counter based on image data is also the same.

Furthermore, in each of the embodiments described above, the cases were explained in which printing is performed by an electrophotographic method using monochrome toner as an achromatic material and color toner as chromatic color, however, printing may also be performed by an inkjet method using monochrome ink as an achromatic material and color ink as a chromatic material.

In a typical image forming apparatus as described above, it is possible to calculate the billing amount according to the consumed amounts of the respective Y, M, C and K toners, however, there is a problem in that it is not possible to count the number of prints with high accuracy.

The image forming apparatus and the print-number-counting program according to the present disclosure can count the number of prints with high accuracy.

The image forming apparatus according to the present disclosure is an MFP in each of the embodiments described above, however, the image forming apparatus can be an apparatus other than an MFP such as a machine dedicated to printing, a machine dedicated to copying and the like.

What is claimed is:

1. An image forming apparatus comprising:
   a monochrome counter for counting a number of monochrome printing prints;
   a color counter for counting a number of prints of color printing prints;
   a target-counter-setting unit that sets one of the monochrome counter and the color counter as a target counter that will cause the number of prints to be reflected in a printing process;

a print-number-reflection unit that reflects the number of prints in the printing process on the target counter that is set by the target-counter-setting unit;

a printing device that executes printing on a recording medium based on image data; and a printing-device-operating unit that operates the printing device;

wherein the target-counter-setting unit sets the monochrome counter as the target counter when only achromatic material as a color material is consumed in the printing process, and sets the color counter as the target counter when chromatic material as the color material is consumed in the printing process;

the target-counter-setting unit sets the target counter by a specific method when reflecting the number of prints in the printing process on the target counter at a medium supply timing as a timing for starting a supply of the recording medium by the printing device; and the print-number-reflection unit corrects the number of prints reflected on the target counter at the medium supply timing, when the target counter that is set by the target-counter-setting unit using the specific method is different than the target counter that is set by the target-counter-setting unit based on the consumed amount of the color material in the printing process.

2. The image forming apparatus according to claim 1, wherein the print-number-reflection unit sets the number of prints to zero when the color material is not consumed.

3. The image forming apparatus according to claim 1, comprising:

a color-conversion unit that executes color conversion on image data;

a printing device that executes printing on a recording medium based on the image data after color conversion is executed by the color-conversion unit; and a printing-device-operating unit that operates the printing device; wherein the color-conversion unit executes color conversion on the image data based on the color of the color material that can be used in the printing device;

and the target-counter-setting unit sets the target counter based on the image data after color conversion is executed by the color-conversion unit and not based on the consumed amount of the color material in the printing process, when the printing-device-operating unit operates the printing device based on the image data after color conversion is executed by the color-conversion unit.

4. A non-transitory computer readable storage medium that stores a print-number-counting program, where the print-number-counting program causes a computer of an image forming apparatus that comprises:

a monochrome counter for counting a number of monochrome printing prints;

a color counter for counting a number of color printing prints; and a printing device that executes printing on a recording medium based on image data;

to operate as:

a target-counter-setting unit that sets one of the monochrome counter and the color counter as a target counter that will cause the number of prints to be reflected in a printing process;

a print-number-reflection unit that reflects the number of prints in the printing process on the target counter that is set by the target-counter-setting unit; and a printing-device-operating unit that operates the printing device;

wherein the target-counter-setting unit sets the monochrome counter as the target counter when only achromatic material as a color material is consumed in the printing process, and sets the color counter as the target when chromatic material as a color material is consumed in the printing process;

the target-counter-setting unit sets the target counter by a specific method when reflecting the number of prints in the printing process on the target counter at a medium supply timing as a timing for starting a supply of the recording medium by the printing device; and the print-number-reflection unit corrects the number of prints reflected on the target counter at the medium supply timing, when the target counter that is set by the target-counter-setting unit using the specific method is different than the target counter that is set by the target-counter-setting unit based on the consumed amount of the color material in the printing process.

* * * * *